March 3, 1953  N. R. KRAUSE ET AL  2,629,978
ENSILAGE HARVESTER
Filed May 14, 1949  3 Sheets-Sheet 1
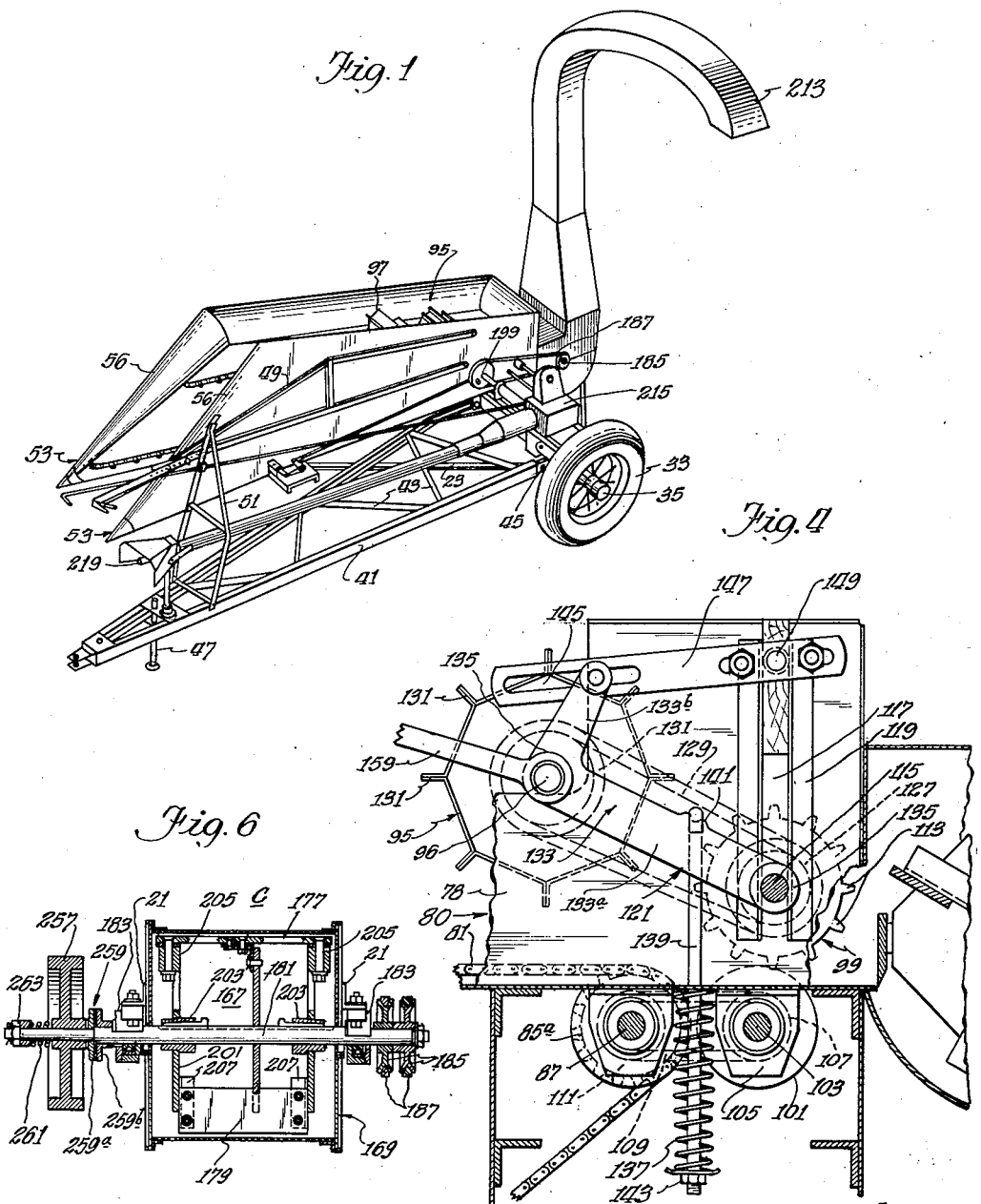
Inventors:
Norman R. Krause
Martin A. Richardson
By: Soans, Pond, & Anderson
Atty's.

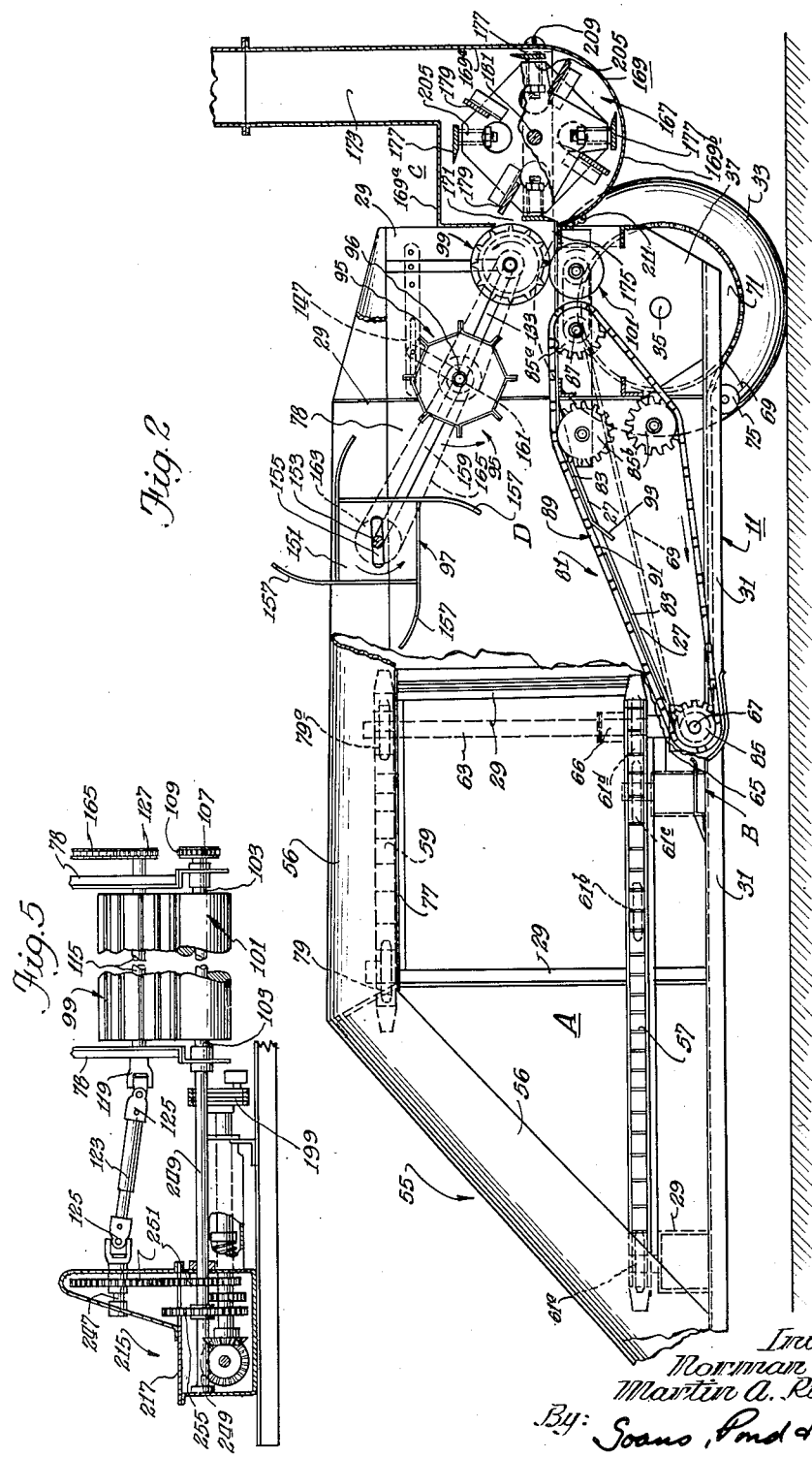

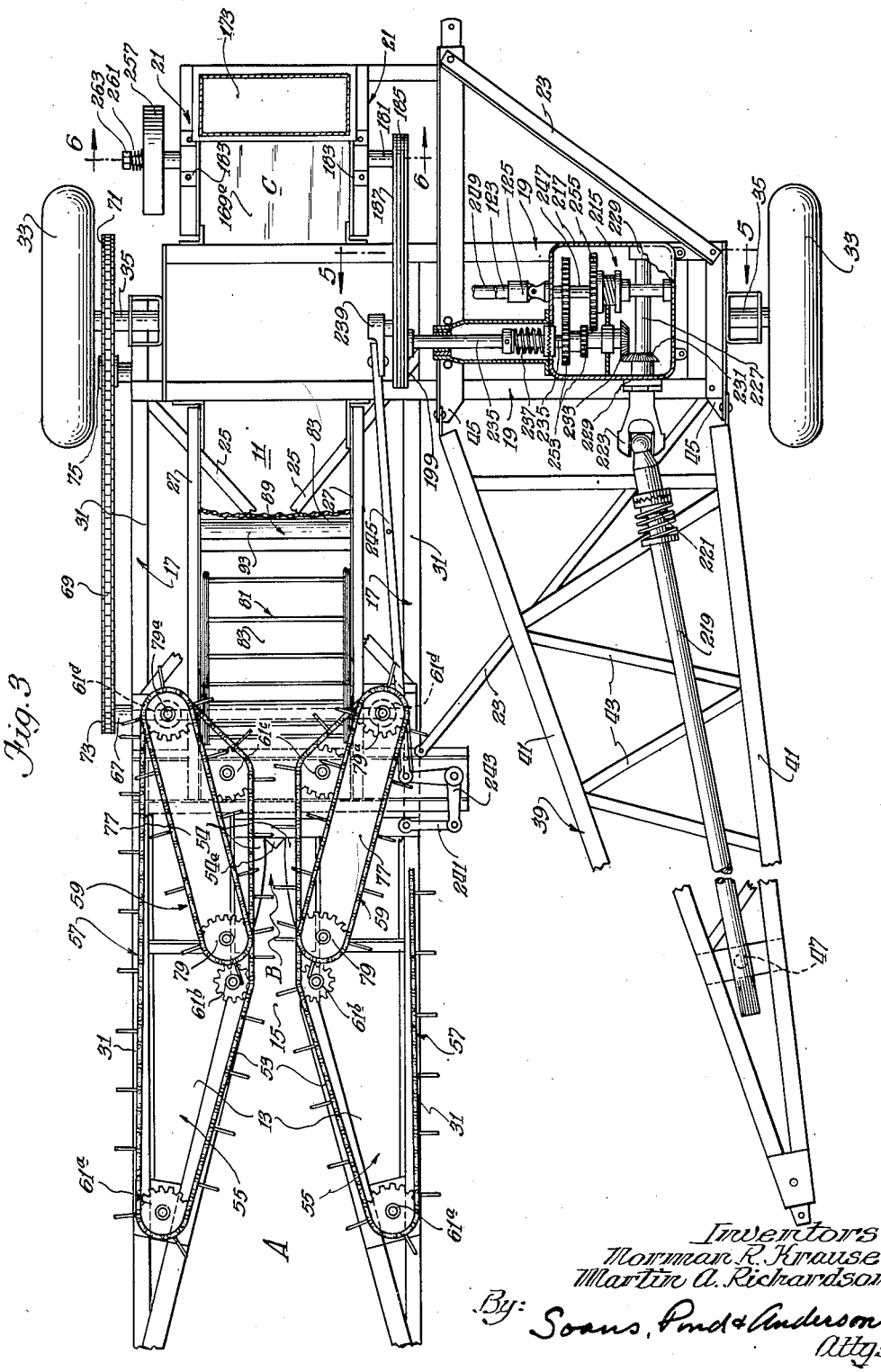

Patented Mar. 3, 1953

2,629,978

UNITED STATES PATENT OFFICE 2,629,978

ENSILAGE HARVESTER

Norman R. Krause and Martin A. Richardson, Racine, Wis., assignors to J. I. Case Company, Racine, Wis., a corporation of Wisconsin Application May 14, 1949, Serial No. 93,264

11 Claims. (Cl. 56—60)

The present invention relates, in general, to ensilage harvesters and, in particular, to ensilage harvesters which are adapted to process row crops.

Ensilage or field forage harvesters are operable to sever a standing crop in the field and to convey the severed crop to a cutting and delivery unit wherein the crop is chopped into suitable short lengths for silage. The cut or processed crop is blown or otherwise conveyed by the cutting and delivery unit into a trailing wagon or the like in which it is transported to a silo or other disposition point.

Conventional ensilage harvesters which are adapted to harvest row crops are provided with at least one pair of spaced apart gathering points which define a stalkway for guiding the stalks of the crop into the harvester. Angularly disposed flights of gathering chains are usually provided along the walls of the stalkway to insure that the stalks move rearwardly into the equipment and to hold the stalks in alignment until they are conveyed into the cutting and delivery unit. Under some conditions, the construction of the gathering points and the arrangement of the gathering chains in the known harvesters tend to strip many of the ears of corn from the stalks especially when the stalks are relatively short. The ears of corn which are stripped from the stalks by the harvester fall to the ground and are lost for feed. Oftentimes this loss of crop results in the waste of an appreciable portion of the food value of the crop.

Recent investigations into the nutritive value of forage crops have shown that the necessity for adding feed adjuvants to the silage may be minimized by planting various legumes such as soya beans, etc. in the hills with the row crop, as for example corn or sorghum. However, this practice of planting mixed forage crops has been greatly restricted since the known row-crop forage harvesters are not adapted to simultaneously process both the tall corn stalks and the low bushy legumes. Further, in order to harvest a mixed forage crop of the type mentioned with the present harvesting equipment, it is necessary to set the crop gathering mechanism of the harvester in very close relationship to the ground to insure that the leguminous plant is gathered and cut by the harvester. Operation of the known harvesters with the crop gathering mechanism in close engagement with the ground is hazardous to the equipment because the harvester mechanism tends to pick up stones and like foreign materials which may cause extensive damage to the cutting and delivery unit when the unyielding objects are conveyed to the cutting and delivery unit along with the severed crop. Thus, most conventional equipment is entirely unsatisfactory for processing such mixed forage crops.

Accordingly, the principal object of the present invention is the provision of an improved harvester of the class described which will overcome the deficiencies of the prior art implements. A further object of the invention is the provision of an ensilage harvester that will effect the efficient harvesting of row crops, regardless of the height of the plant. More specific objects of the invention are the provision of an improved, non-clogging feed mechanism which will receive crop materials in excess of the normal operating capacity; the provision of an independent drive from the ground wheel to the gathering chains; the provision of an improved gathering chain arrangement that will assure that the stalks will approach the cutting unit butt end first so as to facilitate proper cutting; the provision of means for removing stones and like foreign material from the severed crop; and the provision of an improved cutting and delivery unit and a drive mechanism therefor which is operable to efficiently cut up crop material into silage lengths and which is so constructed that damage to the unit will be minimized in the event that stones or other foreign materials are fed into the unit. Other objects and advantages of the invention will become apparent by reference to the accompanying drawings and the following description of an embodiment thereof.

In the drawings:

Fig. 1 is a perspective view of an ensilage harvester embodying various of the features of the invention;

Fig. 2 is an enlarged elevational view, partly in section, of the harvester illustrated in Fig. 1;

Fig. 3 is a fragmentary plan view of the harvester illustrated in the preceding figures;

Fig. 4 is an enlarged, elevational view of the improved crop feeding means which forms an important part of the illustrated harvester;

Fig. 5 is a sectional view taken on line 5—5 in Fig. 3; and

Fig. 6 is a sectional view taken along line 6—6 in Fig. 3.

The ensilage harvester illustrated in the drawings is a pull type implement which is adapted to be drawn by and powered from a tractor or other draft vehicle (not shown). As before pointed out, the harvester is adapted to process row crops and includes a gathering point structure A for guiding the standing crop into the harvester, a reciprocable knife structure (generally indicated as B in the drawings) for severing the standing crop in the field, a cutting and delivery unit C for cutting the crop into suitable lengths for silage and for delivering that material into a transport vehicle, and conveying means D for feeding the severed crop into the cutting and delivery unit C.

All of the elements of the harvester are supported upon a main frame 11 which is fabricated from suitable channel and angle structural members. The main frame 11 is of bifurcated construction and includes a forked forward section 13 (Fig. 3) which defines a stalkway 15 and a box-like rearward section 17 which is adapted to support the conveying means D and the crop cutting and delivery unit C. As illustrated in Fig. 3, the main frame 11 is generally L-shaped in plan and includes, in addition to the generally box-like section 17 which extends parallel to the line of draft of the implement, a transverse frame section 19 which is disposed adjacent the rearwood portion of the box-like section 17. A reinforced, rectangularly shaped frame section 21 is attached to the rearward portion of the box-like section 17 to provide a support for the cutting and delivery unit C.

The frame sections 13, 17, 19, and 21 are rigidly interconnected by plate and angle sections and are reinforced by suitable struts and diagonally extending bracing members. In particular, the outwardly extending portion of the transverse frame section 19 is rigidly held in position by means of a pair of diagonally extending struts 23 one of which extends forwardly from the transverse frame section 19 to the box-like frame section 17, and the other of which extends intermediate the frame section 21 and the outward portion of the transverse section 19. The box-like section 17 is reinforced by a pair of crossed angle members 25 and by a pair of longitudinally extending members 27 (Figs. 2 and 3). The longitudinally extending members extend rearwardly and upwardly from a point adjacent the crop severing means B to provide a support for a portion of the conveyor means D which will be hereinafter described. The frame 11 also includes a plurality of upwardly extending members 29 which are attached at their upper and lower ends to generally horizontally extending frame members 31. The upwardly extending members 29 are particularly shown in Fig. 2.

The frame 11, which has been described, provides the basic framework for the harvester and is further reinforced by the location of the other elements of the harvester mechanism in the manner which will hereinafter be described. However, a particularly rigid structure which is especially adapted for operation close to ground level is obtained when the horizontally disposed, longitudinally extending frame members 31 extend the entire length of the implement as illustrated in Figs. 2 and 3, and are fabricated from relatively sized structural members.

A pair of spaced-apart, support wheels 33 are journalled on an axle 35 which is affixed to gusset plates 37 rigidly attached to the frame 11 in order that the harvester may be readily moved about a field. A fabricated, yoke-shaped drawbar 39 (Figs. 1 and 3) which includes a pair of channel side sections 41 and suitable cross members 43 is hingedly connected to a pair of gusset plates 45 on the transverse section 19 of the main frame 11, and the forward end of the drawbar 39 is adapted to be connected to the draft bar of a tractor by means of a suitable hitch pin (not shown). The drawbar 39 is provided, at its forward end, with an adjustable stand 47 in order that it may be supported at the proper elevation when the harvester is being connected to the tractor. The stand 47 is, of course, raised during the operation of the machine.

During the operation of the harvester it is necessary to adjust the height of the forward end of the harvester relative to the ground and, in the illustrated harvester, this adjustment is made possible by the provision of a longitudinally extending adjusting lever 49 (Fig. 1) which is adapted to hold the main frame 11 in various positions relative to the drawbar 39. The rearward end of the adjusting lever 49 is rigidly attached to the box-like section of the frame 11, and the forward end of the adjusting lever 49 extends to a position over the forward end of the drawbar 39. The lever 49 is adapted to be held in various positions relative to the drawbar by means of a notched link and spring connection 51.

As the harvester is moved through the field along the rows of crops, the standing crop materials are gathered into the stalkway 15 defined by the bifurcated section 13 of the main frame 11 by the forward motion of the harvester. As is shown particularly at Fig. 3, the bifurcated section 13 of the main frame 11 includes the longitudinally extending, horizontally disposed members 31 which define the outer sides of the frame 11 and a pair of inwardly and rearwardly extending members 53 (Fig. 3) one of which is attached to the forward end of each of the members 31. The rearward portions of the members 53 are curved to provide a guiding throat for the crop cutting means B and the rearward end of each of the members is rigidly attached to one of the main frame elements which constitute a part of the box-like section 17 of the main frame 11. Fixed knife blades 54 are attached to the rearward end of each of the members 53, and a reciprocable knife 54a is supported intermediate the blades 54. The reciprocable knife 54a is operably connected to the harvester drive mechanism as will be hereinafter described.

Movement of the crop materials into the stalkway 15 is facilitated by the provision of a pair of fabricated gathering points 55 (Figs. 1 and 2). The gathering points 55 include sheet metal sections 56 which are attached to the frame 11 and which are shaped to provide smooth surfaces for guiding the crop materials into the implement. Each of the gathering points 55 also include a pair of vertically spaced apart, horizontally disposed, longitudinally extending gathering chains 57 and 59 which, as will hereinafter be pointed out, constitute one of the important features of the invention. Each of the gathering chains 57 and 59 are of conventional construction and constitute a plurality of chain links which are interconnected and which carry a plurality of spaced apart rake or spud links. The lower gathering chains 57 (Figs. 2 and 3) of each of the gathering points 55 constitute a cooperating pair which are disposed closely adjacent the bottom portion of the associated gathering points 55.

Each of the gathering chains 57 is supported upon four sprockets 61a, 61b, 61c, and 61d. These sprockets are arranged so that the runs of the gathering chain 57 extend from the forwardmost sprocket 61a rearwardly along the walls of the stalkway 15 to the idler and guide sprocket 61b. The run of chain 57 then extends rearwardly along the throat section of the stalkway 15, past the reciprocating knife 54a, and around a guide sprocket 61c. After the chain has passed the reciprocating cutter knife B, the chain 57 diverges from the center line of the stalkway to the driving sprocket 61d. The run of the chain 57 then returns to the sprocket 61a. Each of the chains 57 is driven from a vertically extending, rotatively supported shaft 63 which passes through and which is keyed to the sprocket 61d. Each of the shafts 63 are driven through a set of bevel gears 65 and an overriding clutch 66 from a transversely extending, horizontally disposed shaft 67 which is rotatively journalled in the frame 11. The shaft 67 is operatively connected to one of the support wheels 33 by means of a chain 69 (Figs. 2 and 3) which interconnects a sprocket 71 attached to the support wheel 33 to a sprocket 73 attached to the end of the shaft 67. An idler sprocket 75 is disposed along the run of chain to guide the lower run of the chain 67.

The upper gathering chains 59 constitute a pair of outwardly diverging runs of a conventional rake-link chain. As illustrated, each of the runs of chain is disposed upon and is guided by a supporting board 77 which is rigidly attached to the bifurcated frame section 13. As shown particularly in Fig. 3, sprockets 79 and 79a are located at the forward and rearward ends, respectively, of each of the runs of chain 59 to support and to guide the chain. Each of the chains 59 are driven from the sprockets 79a by the vertically extending shaft 63 which passes through the drive sprocket 61d for the lower gathering chain 57. As may be seen from the drawings, the forwardmost end of the chains 59 is located substantially directly above the throat of the stalkway 15 so that the stalks of corn or other tall crop are merely trapped by the upper chains 59 rather than being forced rearwardly as in the conventional harvester. This results in highly improved operation of the harvester and substantially eliminates "bunching" of the crop materials as they are being fed into the processing mechanisms.

It is important that the forward rate of travel of the implement relative to the ground should be equal to that of the rearward rate of travel of the gathering chains. This relationship should remain constant whether the power take-off speed is greater or less than normal operating speed. This is accomplished by driving the gathering chains from the ground wheel 33 and sprocket 71, independently of the power take-off, resulting in the gathered and severed material being transported rearwardly through the stalkway in a substantially vertical position. In addition, since the gathering chains are driven from the ground wheel 33, the gathering chains will function properly through the full range of ground speed. As shown in Fig. 3, the gathering chains 59 diverge rearwardly, thereby losing their conveying effect on the stalks. Gathering chains 53, however, continue to convey the stalks rearward until the stalks engage the crop conveyor. The result of this co-action of gathering chains 53 and 59 is to allow the top of the stalks to lean forwardly when the bottoms thereof are carried rearwardly toward the cutting unit. This operation presents the bottom or butt end of the stalk to the cutting and delivery unit first, this being a desirable condition for efficient operation.

In order to guide the severed crop materials rearwardly into the crop cutting and delivery unit C, the sheet metal walls 56 of the gathering points 55 are continued rearwardly by generally vertically disposed sheet sections 78 which form the sides of a conveyor hopper 80. The bottom of the hopper 80 is defined by a cross slat conveyor 81 which extends upwardly and rearwardly from the cutting knife 54a. The cross slat conveyor 81 includes a flat apron 83 of sheet metal or the like. The apron 83 is supported upon the frame elements 27 and provides a ramp upon which the crop materials are moved in their path from the cutter means B to the cutting and delivery unit C. Movement of the crop materials along the apron 83 is effected by the endless cross slat or carrier rake conveyor 81 which is supported upon pairs of spaced apart sprockets 85 and 85a located at the forward and rearward ends of the conveyor 81 and upon a pair of idler sprockets 85b located intermediate the sprockets 85 and 85a. The forward sprockets 85 are journalled for free rotation upon the transversely extending, horizontally disposed shaft 67 which constitutes the driving shaft for the gathering chains. The shaft 67 constitutes both a bearing for the forward conveyor supporting sprockets 85 and a driving shaft for the gathering chains 57 and 59. The rearward set of supporting sprockets 85a are attached to a shaft 87 which is rotatively journalled in the main frame 11, and this shaft 87 is connected by suitable power transmission means to the harvester drive mechanism.

The apron 83 which extends upwardly from the cutting means B to the cutting and delivery unit C is provided with a trap 89 which is adapted to permit stones and other dense foreign materials to fall from the crop materials as they are moved upwardly along the apron 83. The trap 89 illustrated (Fig. 2) is provided in the apron 83 by forming a relatively wide slot 91 in the apron 83 which extends transversely of the line of motion of the cross-slat conveyor 81. An angularly disposed plate 93 is rigidly attached to the rearward edge of the slot 91 and, as shown particularly in Fig. 2, the plate 93 is disposed so that the materials which are moved upwardly along the conveyor 81 will be carried across the slot 91 by the conveyor. The dense materials such as rocks which might cause damage to the cutting and delivery unit fall from the crop materials through the opening provided by the slot 91. The plate 93 prevents the butts of corn stalks and the like from being wedged in the slot and thereby insures the uninterrupted movement of the crop along the apron 83. Operations in the field have shown that particularly effective separation of dense materials from row crops is effected when the conveyor 81 travels at a rate of about 250 feet per minute, slot 91 is 6 inches wide (measured along the line of travel of the conveyor 81), and the plate 93 makes an angle of about 30 degrees with the surface of the apron 83.

In addition to the cross slat conveyor 81, the conveyor means D includes a delivery roll 95 which is rotatably supported on a shaft 96, a rotatable beater roll 97, and a pair of vertically disposed cooperating squeeze type feed rolls 99 and 101. The lower feed roll 101 (Fig. 4) is smooth surfaced and is supported on a shaft 103 which is journalled in suitable bearings 105 provided in the main frame 11. The supporting shaft 103 is directly connected to the main driving mechanism of the unit as will hereinafter be described. A sprocket 107 is keyed to the shaft 103 and this sprocket 107 is connected by a chain 109 to a sprocket 111 which is keyed to the rearward supporting shaft 87 of the conveyor 81. Through this arrangement, the lower feed roll 101 and the cross slat conveyor 81 are operated at the same relative peripheral speed.

The upper feed roll 99 is of hollow construction and the outer surface of the roll is provided with a series of longitudinally extending ribs 113 which are adapted to grip the material being fed to the cutting and delivery unit C. The upper feed roll 99 is supported upon a shaft 115 having an extension at either end thereof which passes through vertically extending slots 117 defined by vertically extending angle sections 119 attached to the side sections 78 of the hopper 80. In order to accommodate the varying amounts of material which are delivered to the harvester during normal operation, it is necessary that the feed rollers 99 and 101 be movable relative to each other. In the illustrated structure, this desired movement is accomplished by the provision of a floating bearing means 121 (Fig. 4) located at either end of the upper feed roll shaft 115. As will hereinafter appear, the bearing portion of each of the floating bearing means 121 engages the upper feed roll shaft 115 externally of the slots 117 provided in the sides of the hopper 80. The drive for the shaft 115 is connected directly to the driving mechanism of the harvester through a suitable extensible shaft 123 and universal joints 125 (Fig. 5). A drive sprocket 127 is provided at one end of the upper feed roll supporting shaft 115 and this sprocket is connected by a chain 129 to a sprocket 131 keyed to the corresponding end of the delivery roll shaft 96. Through this means, the delivery roll 95 is driven at a peripheral speed proportional to the speed of the squeeze type feed rolls 99 and 101.

The delivery roll 95 is of fabricated construction and generally comprises a hollow roll body having feeder blades 131 which are attached to the surface thereof. The floating bearing means 121 which supports the upper feed roll 99 and the delivery roll 95 includes a pair of L-shaped link members 133 which comprise a generally horizontally disposed section 133a and a generally vertically extending section 133b. A suitable bearing 135 is attached to each end of the horizontally disposed link section 133a. One of the link members 133 is disposed on each side of the harvester outside of the sheet sections 78 to engage each end of the delivery roll and upper squeeze roll shafts as is shown in Fig. 4. The delivery roll shaft 96 is journalled into the bearing 135 at the forwardmost end of the generally horizontally disposed section 133a, that is the end at which the section 133a is attached to the vertically extending section 133b, and the bearing 135 at the other end of the section 133a is journalled on the end of the upper feed roll shaft 115.

In order to resiliently bias the upper feed roll 99 toward the lower feed roll 101 and the delivery roll 95 toward the conveyor 81, the mechanism includes a pair of springs 137 one of which is located at either side of the frame 11. Each of the springs 137 is connected to one of the sections 133a of the link members 133, intermediate its ends, by a tie rod 139 which engages a boss 141 on the section 133a. Each tie rod 139 extends through an opening in the bottom of the hopper 80 as shown in Fig. 4. One end of each spring 137 bears against the lower side of the bottom of the hopper 80 and the other end is connected to the lower end of the cooperating tie rod 139 by a nut and washer assemblage 143 to provide the required pressure to maintain the delivery and squeeze rolls in position.

In order that the axis of the delivery roll 95 is maintained in a horizontal plane at all times during the operation of the conveyor means D, the free end of each of the vertically extending link sections 133b is slidably supported in a slot 145 which is formed in a forwardly extending lever arm 147. A lever arm 147 is disposed on each side of the harvester, and each of the lever arms 147 are rigidly attached at their rearward ends to a bearing shaft 149 which is horizontally disposed and which extends transversely of the harvester. The bearing shaft 149 is rotatively supported in bearings in the frame 11 and as a result, pivotal movement of one of the arms 147 about the axis defined by the shaft 149 causes a corresponding pivotal movement of the other arm 147. Since each of the arms 147 is slidably engaged by the vertically extending section 133b of the link members 133, the simultaneous pivotal movement of the arms 147 causes the delivery roll to maintain a level position at all times.

The slots 145 in the arms 147 are so proportioned that upward movement of the delivery roll 95 over a predetermined distance will cause the vertically extending sections 133b of the link members 133 to move to the rearward end of the slot 145 whereupon further upward movement of the delivery roll 95 will cause the squeeze type feed roll 99 to be lifted away from the lower squeeze roll 101 along a path defined by the slot 117 in the walls of the hopper 80.

When a slug of excessively heavy or damp material passes under the delivery roll 95 the described construction simultaneously effects a separation between squeeze rolls 99 and 101, thereby allowing the slug to pass readily through the squeeze rolls 99. In a feeding mechanism not provided with an arrangement of this type, the slug of material must effect the separation of rolls 95 and 101, unaided, frequently resulting in clogging of the squeeze rolls 99. Thus, it will be seen that the automatic upward movement of the squeeze roll 99 in response to the passage of large volumes of crop materials under the delivery roll 95 permits the harvester to handle large overloads for substantial periods of time without danger of clogging the mechanism. When the excessive volume of material has passed, the pressure exerted by the springs 137 on the links 133 will return the delivery roll 95 and the upper feed roll 99 to their normal positions.

The beater roll 97 is also of fabricated construction. The illustrated beater roll comprises a core section 151 which is generally box-like and which is supported upon a shaft 153. The shaft 153 is supported in horizontally extending slots 155 in the side members 78 of the hopper 80, and so that the beater roll 97 is positioned closely adjacent the rearward or discharge end of the upper set of gathering chains 59 and above and forwardly of the delivery roll 95. A plurality of curved vanes 157 which extend generally radially outwardly from the roll 97 are attached to the core 151 of the beater roll, and these vanes are curved in a direction opposite that of the rotation of the roll.

The beater roll 97 and the delivery roll 95 are mechanically interconnected by a pair of link members 159 which are rotatably attached at one end to the delivery roll shaft 96 and at the other end to the beater roll shaft 153. In the illustrated harvester, the beater roll 97 is driven from a power transmission means which interconnects the beater roll shaft 153 with the delivery roll shaft 96. This is accomplished by providing the delivery roll shaft 96 and the beater roll shaft 153 with sprockets 161 and 163 respectively, and operatively connecting these sprockets with a drive chain 165.

The described arrangement of the feed rolls 99 and 101, the delivery roll 95 and the beater roll 97, wherein one of the feed rolls 99, and the delivery roll 95 are vertically movable and the beater roll 97 is held in a fixed vertical position relative to the incoming crop, results in particularly effective crop conveying action. Further, the specific arrangement of the gathering chains 57 and 59 and the cross slat conveyor 81 co-operate to insure that all of the stalks will be fed into the cutting and delivery unit butt end first, while at the same time insuring that the bushy leguminous crop will be positively conveyed rearwardly through the mechanism. In addition, the particular arrangement of the upper gathering chains 59 and the beater roll 97 serves to distribute the crop materials across the hopper 80, thereby causing a uniform feed to the cutting and delivery unit C.

The cutting and delivery unit C is supported at the rearward end of the harvester on the rectangular frame section 21. Particularly efficient operation is effected when a cylinder-type cutting and delivery unit is employed, and this unit may be of the type shown in the application of Martin A. Richardson, Serial No. 43,674, now Patent 2,594,583 which was filed on August 11, 1948, and which is assigned to the assignee of the present invention. A brief description of this unit will be given to facilitate a better understanding of the apparatus.

The cutting and delivery unit C, Figs. 2 and 6, includes a cutter and blower assemblage 167, a generally cylindrical housing 169 which is provided with an inlet opening 171 and an outlet opening 173, and a shear plate 175 which is attached to the main frame 11 intermediate the cutter and blower housing 169 and the discharge end of the conveyor means D. The crop material being processed is fed across the shear plate 175 by the conveyor means D associated with the harvester, whereupon the crop is chopped into short lengths by a plurality of rotatable knives 177 which form a part of the cutter and blower assemblage 167. The cut or chopped up crop material is then ejected through the outlet opening 173 in the housing 169 by blower vanes 179 which are also a part of the cutter and blower assemblage.

The cutter and blower assemblage includes a horizontally disposed, transversely extending shaft 181 (Fig. 6) which is rotatably journalled in a pair of adjustable positionable bearings 183. The bearings are rigidly fastened to the rectangular frame section 21 which constitutes a part of the main frame 11. A pair of pulleys or sheaves 185 are secured to the shaft 181, and the pulleys 185 engage a pair of V belts 187 which in turn engage a pair of pulleys 199 (Fig. 5) on the drive mechanism of the harvester. In the described structure, a V-belt drive is employed to rotate the cutter and blower assemblage, however, other power transmission means can be used, as for example a sprocket and chain, a set of gears, etc.

The ends of the cutter assemblage 167 are defined by a pair of spider support members 201 which may be fabricated from plate material in the shape of modified squares. A bearing hub 203 is attached to the central portion of each spider and the hubs in turn are attached to the supporting shaft 181 at spaced apart points along the length thereof. Each spider has a number of flat seats 205 circumferentially arranged for supporting four knife blades 177 which are bolted to the seats 205. The blades 177 are of conventional design and each has one lateral edge sharpened to form a cutting edge.

The fan or blower vanes 179 are positioned in alternate relationship with the knife blades 177, each fan vane being disposed closely behind its associated knife blade. Each of the fan vanes 179 may be conveniently attached to the spiders 201 by a pair of radially extending angle members 207, one of which is welded or otherwise attached to the inner surface of each of the spiders to provide an inwardly extending bearing surface for each of the fan vanes 179.

It is also desirable to locate the outer edge of each of the fan vanes 179 radially inwardly of the circular path described by the knife blades during the rotation of the assemblage 167 in order that the fan vanes 179 will clear the incoming crop materials when they extend beyond the shear plate 175. This may be accomplished by correlating the linear velocity of the incoming crop material, the rate of rotation of the cutter and blower assemblage 167, the number of knife blades 177 disposed around the periphery of the assemblage, and the angle of lag between the cutting edges of the knife blades 177 and the outer edge of each of the fan vanes 179.

The sheet metal housing 169 which encloses the cutter and blower assemblage 167 includes two sections; the upper section, 169a, being rigidly attached to the frame of the implement, and the lower section, 169b, being swingably attached to the upper section 169a by means of a hinge 209. A suitable latch 211 is provided to maintain the lower section 169b in the closed position. The lower or hinged portion of the housing 167 is semi-cylindrical in shape and extends closely adjacent the path of the knife blades 177 and the fan vanes 179. The outlet opening 173 is provided in the upper section of the housing 167 and a suitable discharge pipe 213 for the cut crop is connected to the outlet opening 173. In operation, the crop materials are chopped into silage lengths by the knife blades 177 as the assemblage 167 is rotated and the chopped or cut crop is propelled up the discharge pipe 213 by the fan vanes 179.

All of the power driven elements of the harvester with the exception of the gathering chains 57 and 59, are driven from the harvester drive mechanism 215 which is supported upon the transversely extending frame section 19. The drive mechanism 215 includes a plurality of power transmission gears which are protectively surrounded by a housing 217. The power transmission gears are connected operatively to the reciprocable cutter knife B, the rotatable cutter and blower assemblage C, and the conveyor means D. As has been pointed out, the power for the implement is provided by the power take-off of the associated tractor or other draft vehicle and a longitudinally extending power take-off shaft 219 which includes an over-riding clutch 221, extends longitudinally of the drawbar 39 from a point adjacent the forward end thereof to one section of a universal joint 223 located adjacent the forward face of the drive mechanism housing 217. Of course, at least one supporting bearing, not shown, is provided along the power take-off shaft to provide the necessary support therefor. The other section of the universal joint 223 is attached to a longitudinally extending shaft 227 which is rotatively supported in suitable bearings 229 in the housing 217, and a bevel gear 231 on the shaft 227 engages a bevel gear 233 on a transversely extending shaft 235. The shaft 235 is adapted to transmit power to the cutter knife B and to the cutter and blower assemblage 167. The shaft 235 is fabricated in two sections and an over-riding clutch 237 is provided intermediate the sections to protect the drive mechanism should any of the driven elements become blocked during the operation. The inner end of the shaft 237 is provided with the pair of pulleys 199 which are adapted to be connected to the cutter and blower assemblage 167 by the pair of V belts 187. The inner end of the shaft 235 also is provided with an eccentric pitman drive 239 and this drive is operably connected with the reciprocable cutter knife B by a power transmission means which includes a pivoted link 241, a bell crank lever 243, and a longitudinally extending pitman 245.

As is illustrated particularly in Figs. 3 and 5, the supporting shaft 115 for the upper squeeze type feed roll is connected to a stub shaft 247 in the drive mechanism housing 217 by the extensible shaft 123 and the pair of universal joints 125. In addition to the stub shaft 247 and the shaft 235, a third transversely extending shaft 249 is journalled in the housing 217 and one end of this shaft is connected to the lower feed roll shaft 103. In order that the upper and lower squeeze type rolls 99 and 101 may be driven at correlated speeds, the stub shaft 247 and the shaft 249 are operatively connected by a pair of meshing gears 251 one of the gears being rigidly attached to each of the associated shafts. Power is transmitted to the shafts 249 and 247 associated with the feed rolls 99 and 101 from the shaft 235 through a pair of spaced apart, mechanically interconnected gears 253 which are supported upon a splined portion (not shown) of the shaft 235. The gears 253 are adapted to selectively engage either the lower gear of the meshing gears 251 or a gear 255 which is keyed to the shaft 249 in spaced apart relation to the gear pair 251. The pair of gears 253 on the splined section of the shaft 235 are of differing sizes, as illustrated, so that the speed of the rolls 99 and 101 may be changed by shifting the gears 253 along the shaft 235.

Under most operating conditions, it is desirable that the cutter and blower assemblage 167 be provided with additional weight so that the movement of inertia of the assemblage will tend to smooth out the vibrations incident to the operation of the equipment. In the illustrated apparatus, this is accomplished by providing the heavy flywheel 257 on the shaft 181, this flywheel being free to rotate relative to the shaft 181. The inner side of the flywheel 257 (as illustrated in Fig. 6) is provided with one section 259a of a friction coupling 259 and the matching portion 259b, of that coupling is keyed to the shaft 181. Contact is maintained between the section of friction coupling 259b associated with the shaft 181 from the section 259a associated with the flywheel 257 by a coil spring 261 which resiliently urges the flywheel 257 towards the friction coupling section 259b on the shaft 181. The spring 261 is held in compression by a retaining nut and washer assemblage 263.

During operation the cutter and blower assemblage 167 is operated at relatively high speeds, i. e. 1500 R. P. M., and in the event that the relatively light assemblage should strike a foreign object as for example a stone, the torque on the friction coupling 259 will cause the flywheel 257 to rotate relative to the shaft 181 thereby instantaneously reducing the inertia effect of the rotating cutter and blower assemblage 167. A further advantage of the friction clutch assemblage is realized when the apparatus is started in operation since the flywheel 257 will tend to slip relative to the assemblage 167 as the assemblage is accelerated to operating speed. This materially reduces shock loads upon the driving mechanism when the unit is being accelerated to operating speeds.

During operation, the harvester is drawn along the field in a manner such that the rows of crop material being harvested pass into the stalkway 15 at the forward end of the implement. The standing crop materials are guided and moved rearwardly by the lower set of gathering chains 57, and the taller crop materials are engaged by the upper set of gathering chains 59 just prior to the time at which they are severed from the ground by the cutting knife 54a. The lower run of gathering chains 57 carries the butt ends of the severed stalks onto the cross slat conveyor 81 wherein they are moved upwardly along the apron 83. The arrangement and positioning of the lower gathering chains 57 causes the stalks of the crop to be distributed across the entire width of the conveyor 81 and the upper gathering chains 59 co-act with the fixedly positioned beater roll 97 to insure that the upper ends of the stalks are also distributed across the conveyor.

As the conveyor 81 moves the crop materials upwardly and rearwardly, the materials are carried across the transversely extending slot 91 which permits rocks and other dense foreign materials to fall from the crop materials. These foreign objects fall back into the field or, if desired, a box or other receptacle may be disposed under the slot 91 to catch these unwanted objects. After the crop materials have passed the transversely extending slot 91 they are moved rearwardly and are acted upon by the delivery roll 95 which serves to compact the crop materials and to further distribute them across the width of the conveyor 81. The conveyor 81 then moves the compacted crop materials into the squeeze type feed rolls 99 and 101 wherein the materials are further compressed and fed across the shear plate 175. The crop is cut into short lengths by the rapidly rotating cutter and blower assemblage 167 and the blower vanes 179 propel the cut crop material upwardly through the delivery pipe 213 into a trailing wagon or the like.

Various features of the invention which are believed to be new are set forth in the appended claims.

We claim:

1. In a harvester of the class described, a gathering point structure comprising a bifurcated frame, means defining the walls of a stalkway which is relatively wide at the forward end and which converges to form a relatively narrow throat at the rearward end thereof, means located in the throat of said stalkway for severing a standing crop, a lower pair of horizontally disposed, endless gathering chains, said lower gathering chains being supported upon said bifurcated frame, one of said pair being disposed along each of the side walls of said stalkway, each of said lower gathering chains including a run which extends rearwardly from a point adjacent the forward end of said bifurcated frame to a point rearwardly of said crop severing means, said lower gathering chains diverging from each other rearwardly of said crop severing means to distribute the severed crop materials transversely of said harvester, and a pair of upper gathering chains which are horizontally disposed and which are spaced above said lower pair of gathering chains, one of said pair of upper gathering chains being disposed along each of the side walls of said stalkway, and each of said upper gathering chains extending rearwardly from said throat section of said stalkway and diverging from the center line of said stalkway.

2. In a harvester of the class described, a gathering point structure and a crop conveyor, said gathering point structure comprising a bifurcated frame, means defining the walls of a stalkway which is relatively wide at the forward end and which converges to form a relatively narrow throat at the rearward end thereof, means located in the throat of said stalkway for severing a standing crop, said conveyor extending rearwardly of said throat portion of said stalkway to remove the severed crop and being several times as wide as the throat portion of said stalkway, a pair of horizontally disposed, endless gathering chains, said gathering chains being supported upon said bifurcated frame, one of said pair being disposed along each of the side walls of said stalkway, each of said gathering chains including a run which extends rearwardly from a point adjacent the forward end of said bifurcated frame to a point rearwardly of said crop severing means, said gathering chains diverging from each other rearwardly of said crop severing means to move generally transversely of said apron to distribute the severed crop across the width of said conveyor.

3. In a harvester of the class described, a gathering point structure and a crop conveyor, said gathering point structure comprising a bifurcated frame, means defining the walls of a stalkway which is relatively wide at the forward end and which converges to form a relatively narrow throat at the rearward end thereof, means located in the throat of said stalkway for severing a standing crop, said conveyor including an apron which extends rearwardly of said throat portion of said stalkway and a cross slat conveyor which is adapted to move severed crop materials along said apron, said apron and said cross slat conveyor being several times as wide as the throat portion of said stalkway, a lower pair of horizontally disposed endless gathering chains which are supported upon said bifurcated frame, one of said pair being disposed along each of the side walls of said stalkway, each of said lower gathering chains including a run which extends rearwardly from a point adjacent the forward end of said bifurcated frame to a point rearwardly of said crop severing means, said lower gathering chains diverging from each other rearwardly of said crop severing means to distribute the severed crop transversely of the conveyor, and a pair of upper gathering chains which are horizontally disposed and which are spaced above said lower pair of gathering chains, one of said pair of upper gathering chains being disposed along each of the side walls of the stalkway in a position extending rearwardly from said throat section of said stalkway and diverging from the center line of said stalkway.

4. In apparatus of the class described, having a main frame, means defining a stalkway at the forward end of said main frame, horizontally disposed gathering chains for guiding crop material through said stalkway, means for severing a standing crop, crop cutting and delivery means disposed on said main frame, said cutting and delivery means including means defining an inlet opening, the improvement comprising means including an endless conveyor and a plurality of feed rolls cooperating therewith for conveying the severed crop material from said crop severing means to the inlet of said crop cutting and delivery means, said feed rolls comprising a pair of transversely extending, vertically disposed, squeeze-type rolls disposed adjacent the inlet of said crop cutting and delivery means, a delivery roll disposed forwardly of said squeeze-type rolls and a vane type beater roll disposed intermediate said delivery roll and said gathering chains, means for supporting the upper of said squeeze-type feed rolls and said delivery roll for vertical movement parallel to said endless conveyor, and means for supporting said beater roll in a fixed vertical position relative to said gathering chains.

5. In a conveyor means for apparatus of the class described, a frame, an endless conveyor supported on said frame, a pair of vertically disposed, transversely extending, squeeze-type feed rolls disposed adjacent the delivery end of said endless conveyor, a delivery roll disposed above said endless conveyor forwardly of said squeeze type rolls, means for supporting the upper of said squeeze type rolls and said delivery roll for rotatable movement, said support means including a pair of links one of which is disposed on each side of said endless conveyor, each of said links being rotatably attached to one end of the upper squeeze type roll and to the corresponding end of said delivery roll, each of said links including a generally vertically extending section, a pair of positioning arms disposed in overlying relation to said links and rigidly attached to a transversely extending, horizontally disposed bearing shaft which is journalled in said frame, means for slidably engaging the upper end of said vertically extending section of said links with said associated positioning arm, and means for resiliently biasing each of said links towards said endless conveyor.

6. In an apparatus of the class described, a main frame, means defining a stalkway at the forward end of said frame which is relatively wide at the forward end and which converges to form a relatively narrow throat portion at the rearward end thereof, means located in the throat of said stalkway for severing a standing crop, a crop cutting and delivery means supported on said main frame and having means defining an inlet opening, a conveyor including an endless cross-slat type conveyor and a plurality of feed rolls for conveying the severed crop from said crop severing means to said inlet opening, said conveyor and said rolls being several times wider than said throat portion, a lower pair of horizontally disposed endless gathering chains which are supported in said stalkway, one of which pair is disposed along each side of said stalkway, each of said lower gathering chains including a run which extends rearwardly from a point adjacent the forward end of said stalkway to a point rearwardly of said crop severing means, said lower gathering chains diverging from each other rearwardly of said crop severing means to move generally transversely of said conveyor to distribute the material being harvested across the width thereof, a pair of upper gathering chains which are horizontally disposed and which are spaced above said lower gathering chains, said upper gathering chains being disposed along the sides of the stalkway in a position extending rearwardly of said severing means and diverging from the center line of said stalkway, said plurality of feed rolls comprising a pair of squeeze-type rolls rotatably supported adjacent said inlet opening, a delivery roll disposed above said cross-slat conveyor forwardly of said squeeze-type rolls, the upper of said squeeze-type rolls and said delivery roll being supportedly interconnected for vertical movement parallel to said conveyor in fixed, axially spaced relation, and a vane-type beater roll disposed above said cross-slat conveyor intermediate said delivery roll and said upper pair of gathering chains, means for supporting said beater roll in a fixed vertical position relative to said gathering chains, and means for driving said cross-slat conveyor and said feed rolls at correlated speeds.

7. In an apparatus of the class described, a main frame, means defining a stalkway at the forward end of said frame which is relatively wide at the forward end and which converges to form a relatively narrow throat at the rearward end thereof, means located in the throat of said stalkway for severing a standing crop, a conveyor disposed rearwardly of said throat portion of said stalkway for moving severed crop materials rearwardly, said conveyor being several times wider than said throat portion, a plurality of squeeze-type feed rollers having a length conforming generally with the width of said conveyor and being transversely mounted on said frame in position to receive crop material from said conveyor, a lower pair of endless gathering chains disposed along each side of said stalkway, each of said gathering chains including a run which extends rearwardly from a point adjacent the forward end of said stalkway to a point adjacent the forward end of said conveyor, said gathering chains diverging from each other rearwardly of said crop severing means to move generally transversely of said conveyor and thereby distribute the severed crop across the width of said conveyor, and an upper pair of gathering chains disposed along the sides of said stalkway in a position extending rearwardly of said severing means and diverging from the center line of said stalkway.

8. In an apparatus of the class described, a main frame, means defining a stalkway at the forward end of said frame which is relatively wide at the forward end and which converges to form a relatively narrow throat at the rearward end thereof, means located in the throat of said stalkway for severing a standing crop, a conveyor disposed rearwardly of said throat portion of said stalkway for moving severed crop material rearwardly, said conveyor being several times wider than said throat portion, a plurality of squeeze-type feed rolls having a length conforming generally with the width of said conveyor and transversely mounted on said frame in position to receive crop materials from said conveyor, a delivery roll disposed above said conveyor and forwardly of said squeeze-type rolls, a vane-type beater roll disposed above said conveyor and forwardly of said delivery roll, means for supporting the upper of said squeeze-type feed rolls and said delivery roll for movement parallel to said conveyor with said upper squeeze-type roll moving vertically in response to vertical movement of said delivery roll, a pair of endless gathering chains disposed along each side of said stalkway, each of said gathering chains including a run which extends rearwardly from a point adjacent the forward end of said stalkway to a point adjacent the forward end of said conveyor, said gathering chains diverging from each other rearwardly of said crop severing means to move generally transversely of said conveyor and thereby distribute the severed crop across the width of said conveyor, whereby said beater roll and delivery roll cooperate with said gathering chains and conveyor to deliver the severed crop in a condition of substantially uniform thickness across the width of said feed rolls.

9. In an apparatus of the class described, a main frame, means defining a stalkway at the forward end of said frame which is relatively wide at the forward end and which converges to form a relatively narrow throat at the rearward end thereof, means located in the throat of said stalkway for severing a standing crop, a conveyor disposed rearwardly of said throat portion of said stalkway for moving severed crop material rearwardly, said conveyor being several times wider than said throat portion, a plurality of squeeze-type rolls having a length conforming generally with the width of said conveyor and transversely mounted on said frame in position to receive crop materials from said conveyor, a pair of endless gathering chains disposed along each side of said stalkway, each of said gathering chains including a run which extends rearwardly from a point adjacent the forward end of said stalkway to a point adjacent the forward end of said conveyor, said gathering chains diverging from each other rearwardly of said crop severing means to move generally transversely of said conveyor and thereby distribute the severed crop across the width of said conveyor, a delivery roll disposed above said conveyor and forwardly of said squeeze-type rolls, means for supporting the upper of said squeeze-type rolls and said delivery roll comprising a pair of links positioned at opposite end portions of said rolls to rotatably receive same in axially spaced parallel relation, a pair of vertically extending guideways receiving the shaft of said upper feed roll for vertical sliding movement therein, a pair of positioning arms secured to said frame in overlying relation to said links and including therein a slotted portion, each of said links including an upwardly extending section having its end portion slidably engaged with the slotted portion of the associated positioning arm, and means for resiliently biasing each of said links toward said conveyor, whereby vertical movement of said delivery roll in excess of a predetermined amount results in vertical movement of said upper squeeze-type roll.

10. In an apparatus of the class described having a main frame, a crop gathering means, a crop severing means, and a crop cutting means, the combination of a delivery means for transporting the severed crop material from the severing means to the inlet opening of the cutting means comprising, an endless conveyor structure, a pair of transversely extending vertically disposed squeeze-type rolls disposed intermediate the delivery end of said conveyor structure and the inlet opening of said cutting means, a beater roll rotatably mounted on the main frame in overlying relation to said conveyor structure and disposed forwardly of said squeeze-type rolls for movement longitudinally of said frame, a delivery roll disposed intermediate said beater roll and squeeze-type rolls in parallel relation thereto, means supporting said delivery roll and the upper of said squeeze-type feed rolls comprising a pair of links disposed at opposite ends of said rolls and presenting bearing means rotatably supporting said delivery roll and upper squeeze-type roll, a pair of positioning arms pivotally secured at one end to said frame for simultaneous swinging movement relative thereto and disposed in overlying relation to said links, each of said links including an upwardly extending section slidably engaging a slotted portion of the associated positioning arm, a pair of vertically extending guideways receiving the shaft of said upper feed roll for vertical sliding movement therein, means connecting said delivery roll with said beater roll to fixedly maintain the axes of said rolls in spaced relation, and means for resiliently biasing each of said links toward said conveyor, whereby vertical movement of said delivery roll in excess of a predetermined amount results in vertical movement of said upper squeeze-type roll and in movement of said beater roll longitudinally of said conveyor.

11. In an apparatus of the class described, a main frame, means defining a stalkway at the forward end of said frame which is relatively wide at the forward end and which converges to form a relatively narrow throat at the rearward end thereof, means located in the throat of said stalkway for severing a standing crop, a conveyor disposed rearwardly of said throat portion of said stalkway for moving severed crop materials rearwardly, said conveyor being several times wider than said throat portion and comprising a plane fixedly positioned apron extending rearwardly from a point adjacent said crop severing means and an endless cross-slat conveyor having an upper run disposed to move the severed crop material rearwardly along said apron, said apron having an elongated transverse opening across the width thereof and a deflector plate attached to the rear edge of said opening in downwardly and forwardly extending relation thereto, a plurality of squeeze-type feed rolls having a length conforming generally with the width of said conveyor and transversely mounted on said frame in position to receive crop material from said conveyor, a pair of endless gathering chains disposed along each side of said stalkway, each of said gathering chains including a run which extends rearwardly from a point adjacent the forward end of said stalkway to a point adjacent the forward end of said conveyor, said gathering chains diverging from each other rearwardly of said crop severing means to move generally transversely of said conveyor and thereby distribute the severed crop across the width of said conveyor, and said apron and deflector plate cooperating to prevent interference of the unsevered portion of the crop with the rearward movement of the severed portion.

NORMAN R. KRAUSE.
MARTIN A. RICHARDSON.

REFERENCES CITED

The following references are of record in the file of this patent:

UNITED STATES PATENTS

| Number | Name | Date |
|---|---|---|
| 327,649 | Boswell | Oct. 6, 1885 |
| 346,919 | Irwin | Aug. 10, 1886 |
| 851,237 | Holen | Apr. 23, 1907 |
| 1,093,763 | Brown | Apr. 21, 1914 |
| 1,308,818 | Sproul | July 8, 1919 |
| 1,686,519 | Cutler | Oct. 9, 1928 |
| 2,253,794 | Lindholn | Aug. 26, 1941 |
| 2,385,451 | Krause et al. | Sept. 25, 1945 |
| 2,402,849 | Sensenig | June 25, 1946 |
| 2,456,404 | Good | Dec. 14, 1948 |
| 2,477,794 | Gehl | Aug. 2, 1949 |